US012794293B2

(12) United States Patent
Payne

(10) Patent No.: US 12,794,293 B2
(45) Date of Patent: Nov. 10, 2026

(54) SEGMENTED END PLATES FOR ELECTRIC MOTORS

(71) Applicant: Schaeffler Technologies AG & Co. KG, Herzogenaurach (DE)

(72) Inventor: Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 206 days.

(21) Appl. No.: 18/765,941

(22) Filed: Jul. 8, 2024

(65) Prior Publication Data

US 2026/0012051 A1 Jan. 8, 2026

(51) Int. Cl.
*H02K 1/28* (2006.01)
*H02K 1/27* (2022.01)

(52) U.S. Cl.
CPC ................. *H02K 1/28* (2013.01); *H02K 1/27* (2013.01)

(58) Field of Classification Search
CPC .......... H02K 1/28; H02K 1/27; H02K 1/2773; H02K 1/30
See application file for complete search history.

(56) References Cited

U.S. PATENT DOCUMENTS 4,885,495 A * 12/1989 Sisk ......................... H02K 3/20 310/201
6,084,330 A * 7/2000 Fisher .................... H02K 15/03 29/598
6,548,932 B1 * 4/2003 Weiglhofer .......... H02K 1/2773 310/156.19
9,906,084 B2 * 2/2018 Duncan .................. H02K 1/187
9,917,482 B2 3/2018 Lindemann et al.
10,465,780 B2 11/2019 Pyers et al.
10,797,548 B2 10/2020 Payne et al.
10,850,605 B2 * 12/2020 Satyaseelan ............. B60K 6/40
11,469,646 B2 10/2022 Payne et al.
2022/0213950 A1 7/2022 Payne et al.

* cited by examiner

*Primary Examiner* — Tulsidas C Patel
*Assistant Examiner* — Mohammed Ahmed Qureshi
(74) *Attorney, Agent, or Firm* — Suiter Swantz IP

(57) ABSTRACT

End plates may be segmented into annular segments. The annular segments may be joined using interlocking joints to form the end plates. The annular segments may also include radial grooves for channeling fluid radially outwards from the end plates. The end plates may be a non-ferromagnetic metal. A rotor assembly may include a pair of the end plates on opposing sides of a rotor to magnetically isolate permanent magnets within the rotor. The end plates and the rotor may be clamped to a rotor carrier hub of the rotor assembly via a clamp ring. An electric motor may include the rotor assembly for transmitting torque.

20 Claims, 9 Drawing Sheets

300

SEGMENTED END PLATES FOR ELECTRIC MOTORS

TECHNICAL FIELD

The present disclosure generally relates to electric motors, and more particularly, to rotor structures of the electric motors.

BACKGROUND

Two main methods exist for transmitting torque via a rotor: clamping or shrink fit onto the hub. Clamping the rotor onto the hub may require magnetically isolating the rotor from the hub. Therefore, it would be advantageous to provide a device, system, and method that cures the shortcomings described above.

SUMMARY

An end plate for a rotor assembly is described, in accordance with one or more embodiments of the present disclosure. In some aspects, the end plate includes: a plurality of annular segments, wherein the plurality of annular segments define an annulus shape, wherein the plurality of annular segments are a non-ferromagnetic metal, wherein the plurality of annular segments include: a plurality of interlocking joints, wherein the plurality of interlocking joints radially interlock the plurality of annular segments; and a plurality of radial grooves.

In some aspects, the plurality of annular segments include an outer arc length.

In some aspects, the outer arc length is a same length for each of the plurality of annular segments.

In some aspects, the plurality of interlocking joints are one of jigsaw joints, dovetail joints, or T-joints.

In some aspects, each of the plurality of annular segments includes two of the plurality of interlocking joints disposed at opposing circumferential ends of the plurality of annular segments.

In some aspects, the plurality of interlocking joints include a plurality of male joints and a plurality of female joints, wherein the plurality of male joints are received within the plurality of female joints, wherein the end plate includes a matching number of the plurality of male joints and the plurality of female joints.

In some aspects, each of the plurality of annular segments includes one of the plurality of male joints and one of the plurality of female joints.

In some aspects, the plurality of interlocking joints do not axially interlock the plurality of annular segments, wherein the plurality of interlocking joints include a clearance fit.

In some aspects, the plurality of interlocking joints axially interlock the plurality of annular segments.

In some aspects, the non-ferromagnetic metal includes at least one of aluminum, non-ferromagnetic stainless steel, copper, brass, or an alloy thereof.

In some aspects, the plurality of radial grooves are one of a V-channel, a U-channel, or a rectangular-channel.

In some aspects, each of the plurality of annular segments includes at least one of the plurality of radial grooves.

In some aspects, the plurality of radial grooves are arranged in a polar array.

In some aspects, the plurality of annular segments are fabricated from a sheet metal blank via a stamping process.

A rotor assembly is described, in accordance with one or more embodiments of the present disclosure. In some aspects, the rotor assembly includes: a first end plate and a second end plate including: a plurality of annular segments, wherein the plurality of annular segments define an annulus shape, wherein the plurality of annular segments are a non-ferromagnetic metal, wherein the plurality of annular segments include: a plurality of interlocking joints, wherein the plurality of interlocking joints radially interlock the plurality of annular segments; and a plurality of radial grooves; a rotor including one or more rotor segments and a plurality of permanent magnets, wherein the plurality of permanent magnets are disposed within the one or more rotor segments, wherein the rotor is axially disposed between and radially aligned with the first end plate and the second end plate; a rotor carrier hub including a body section and a flange section, wherein the flange section axially and radially extends from the body section; and a clamp ring; wherein the first end plate, the rotor, the second end plate, and the clamp ring are disposed radially outwards of and axially aligned with the body section, wherein the second end plate is axially disposed between the rotor and the flange section, wherein the first end plate is axially disposed between the clamp ring and the rotor, wherein the clamp ring axially clamps together the clamp ring, the first end plate, the rotor, the second end plate, and the flange section.

In some aspects, clamping together the clamp ring, the first end plate, the rotor, the second end plate, and the flange section axially interlocks the plurality of annular segments.

In some aspects, an inner diameter of the one or more rotor segments includes a clearance fit about an outer diameter of the body section.

In some aspects, the rotor and the body section are radially connected via a spline.

In some aspects, the first end plate magnetically isolates the plurality of permanent magnets from the clamp ring, wherein the second end plate magnetically isolates the plurality of permanent magnets from the flange section.

An electric motor is described, in accordance with one or more embodiments of the present disclosure. In some aspects, the electric motor includes: a rotor assembly including: a first end plate and a second end plate including: a plurality of annular segments, wherein the plurality of annular segments define an annulus shape, wherein the plurality of annular segments are a non-ferromagnetic metal, wherein the plurality of annular segments include: a plurality of interlocking joints, wherein the plurality of interlocking joints radially interlock the plurality of annular segments; and a plurality of radial grooves; a rotor including one or more rotor segments and a plurality of permanent magnets, wherein the plurality of permanent magnets are disposed within the one or more rotor segments, wherein the rotor is axially disposed between and radially aligned with the first end plate and the second end plate; a rotor carrier hub including a body section and a flange section, wherein the flange section axially and radially extends from the body section; and a clamp ring; wherein the first end plate, the rotor, the second end plate, and the clamp ring are disposed radially outwards of and axially aligned with the body section, wherein the second end plate is axially disposed between the rotor and the flange section, wherein the first end plate is axially disposed between the clamp ring and the rotor, wherein the clamp ring axially clamps together the clamp ring, the first end plate, the rotor, the second end plate, and the flange section; and a stator, wherein the rotor is disposed radially inwards of and axially aligned with the stator, wherein the stator is configured to generate a magnetic field causing the rotor to generate torque.

BRIEF DESCRIPTION OF THE DRAWINGS

The numerous advantages of the disclosure may be better understood by those skilled in the art by reference to the accompanying figures in which.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to segmented end plates for electric motors. The end plates may be segmented into annular segments. The annular segments may be joined using interlocking joints to form the end plates. The annular segments may also include radial grooves for channeling fluid radially outwards from the end plates. The end plates may be a non-ferromagnetic metal. A rotor assembly may include a pair of the end plates on opposing sides of a rotor to magnetically isolate permanent magnets within the rotor. The end plates and the rotor may be clamped to a rotor carrier hub of the rotor assembly via a clamp ring. An electric motor may include the rotor assembly for transmitting torque.

Figure 1A:
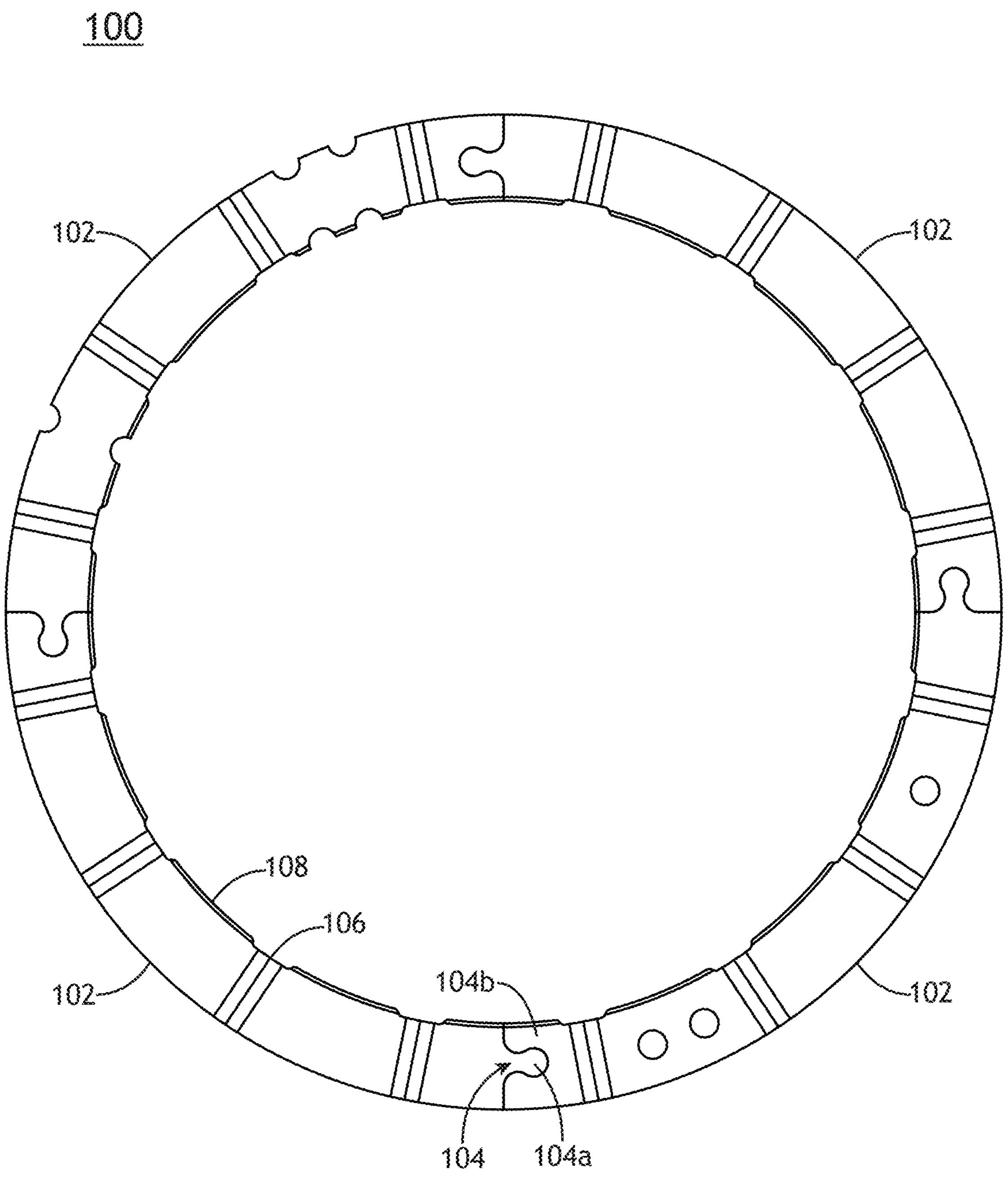
FIG. 1A depicts an elevation view of an end plate, in accordance with one or more embodiments of the present disclosure.
Figure 1B:
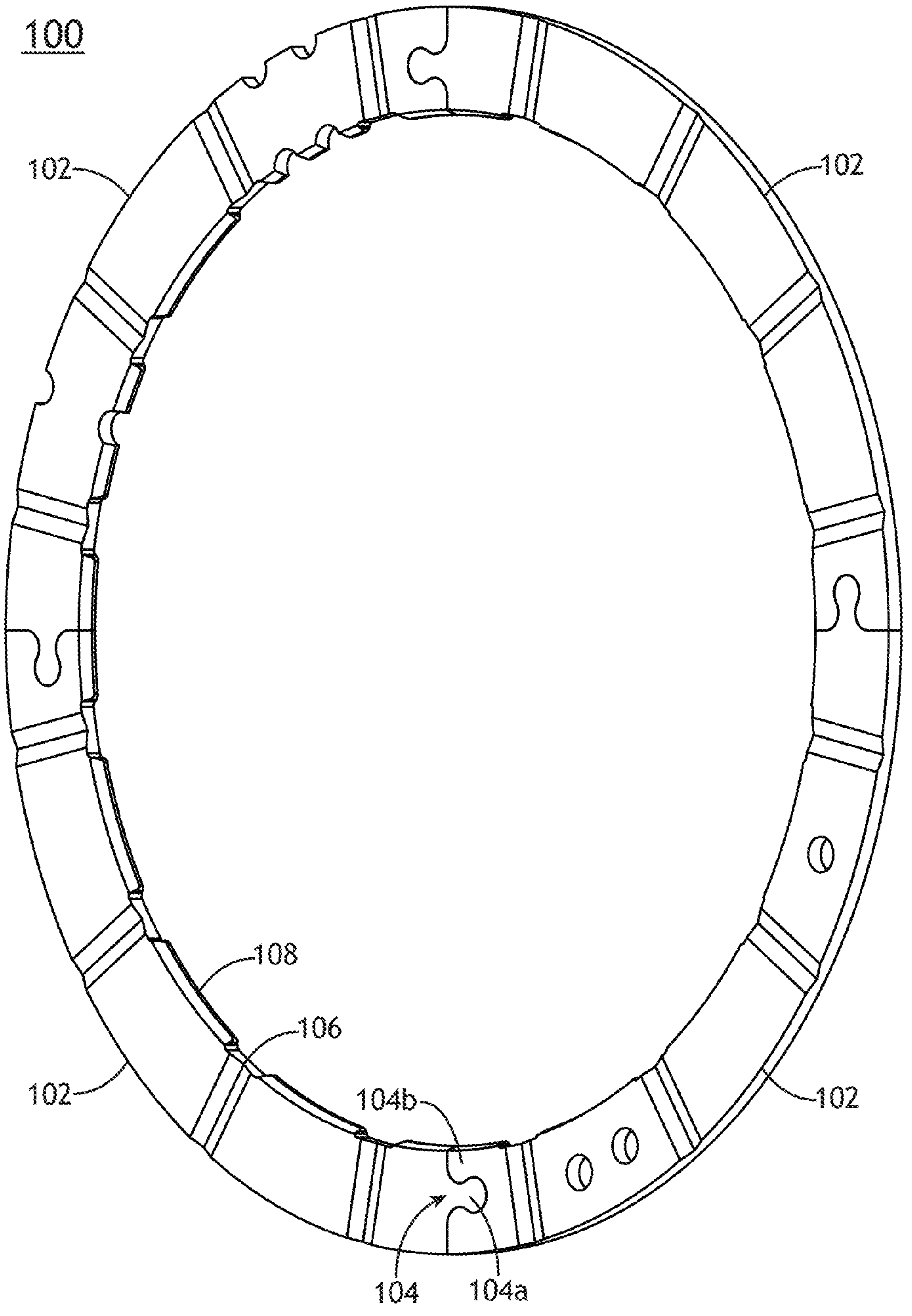
FIG. 1B depicts a perspective view of the end plate, in accordance with one or more embodiments of the present disclosure.
Figure 1C:
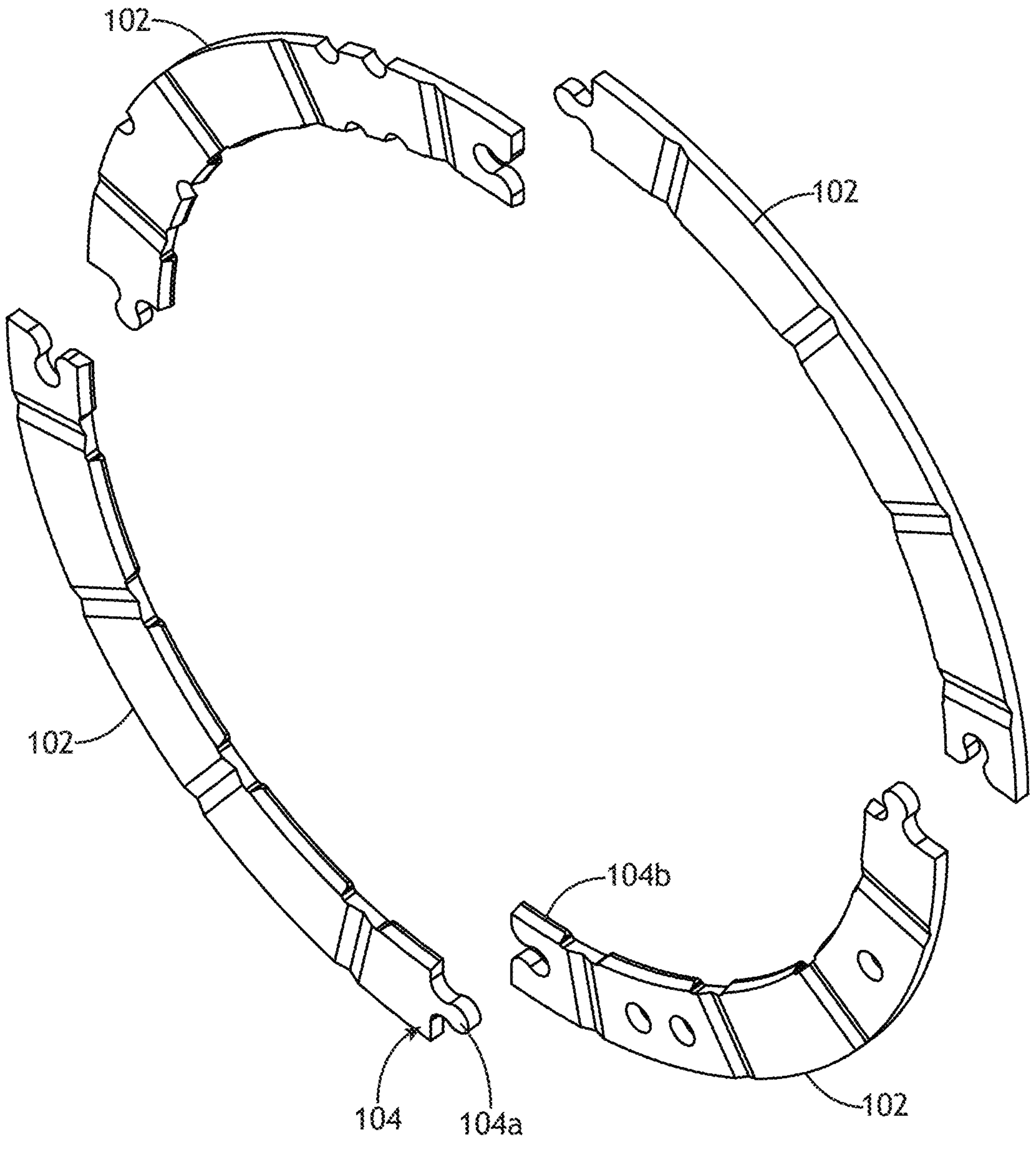
FIG. 1C depicts an exploded view of the end plate, in accordance with one or more embodiments of the present disclosure.
Figure 2A:
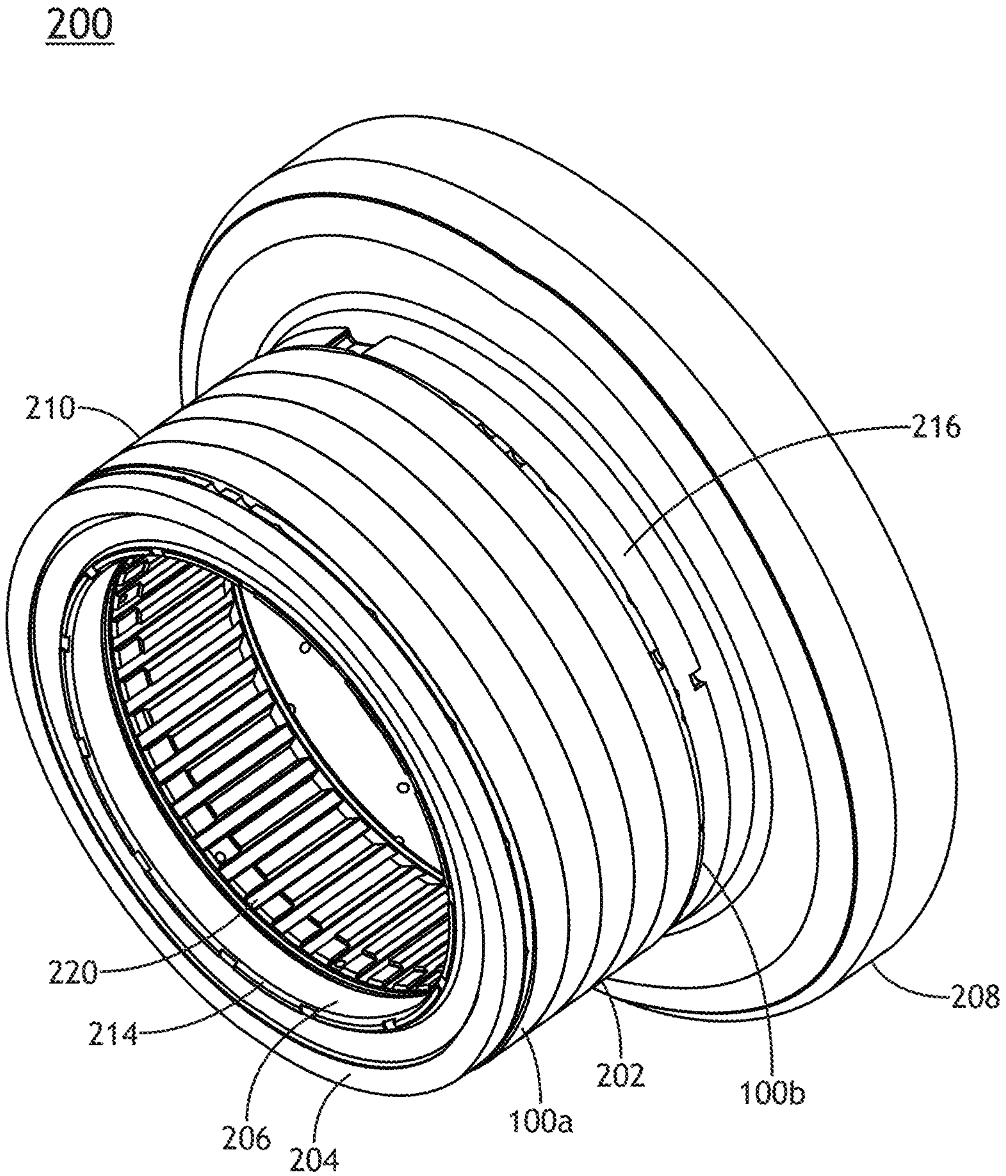
FIG. 2A depicts a perspective view of a rotor assembly with the end plate, in accordance with one or more embodiments of the present disclosure.
Figure 2B:
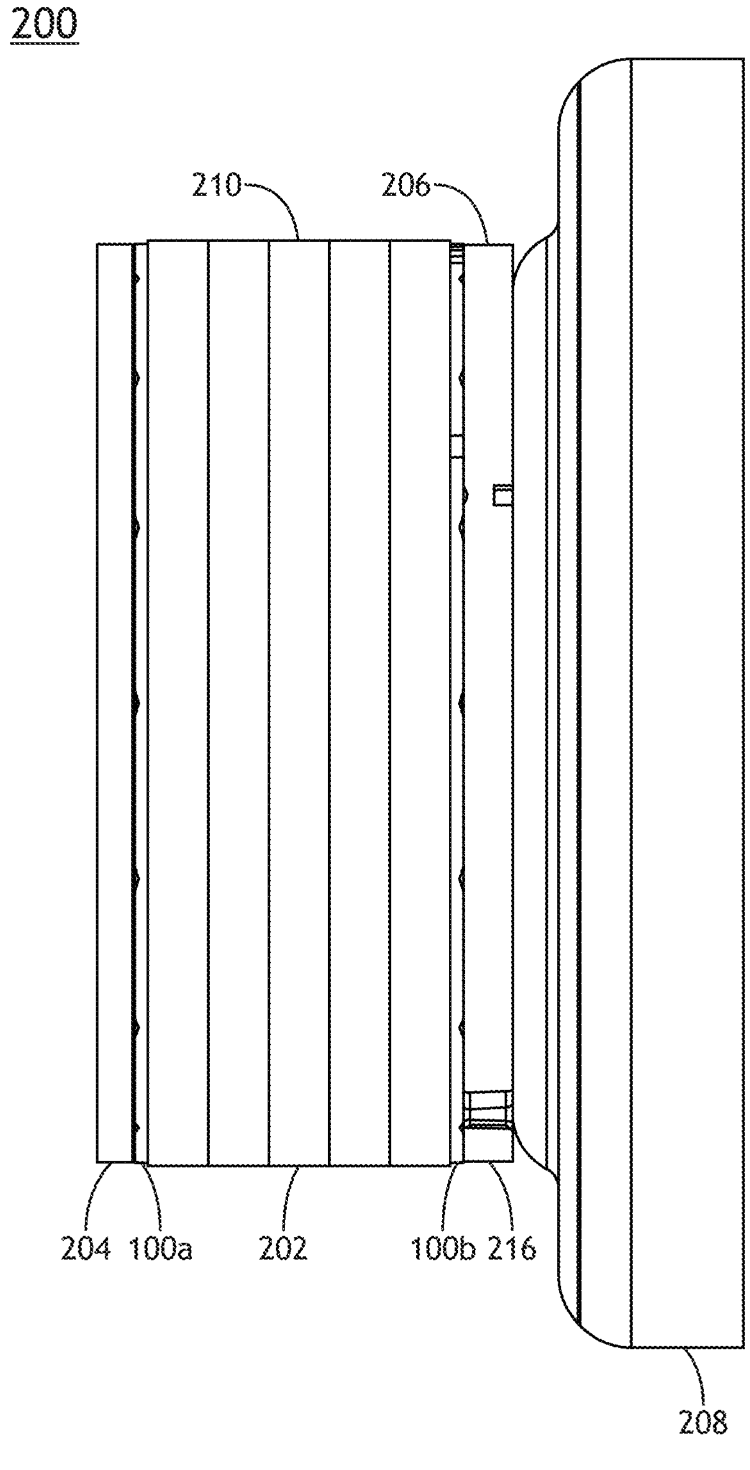
FIG. 2B depicts a side view of the rotor assembly, in accordance with one or more embodiments of the present disclosure.
Figure 2C:
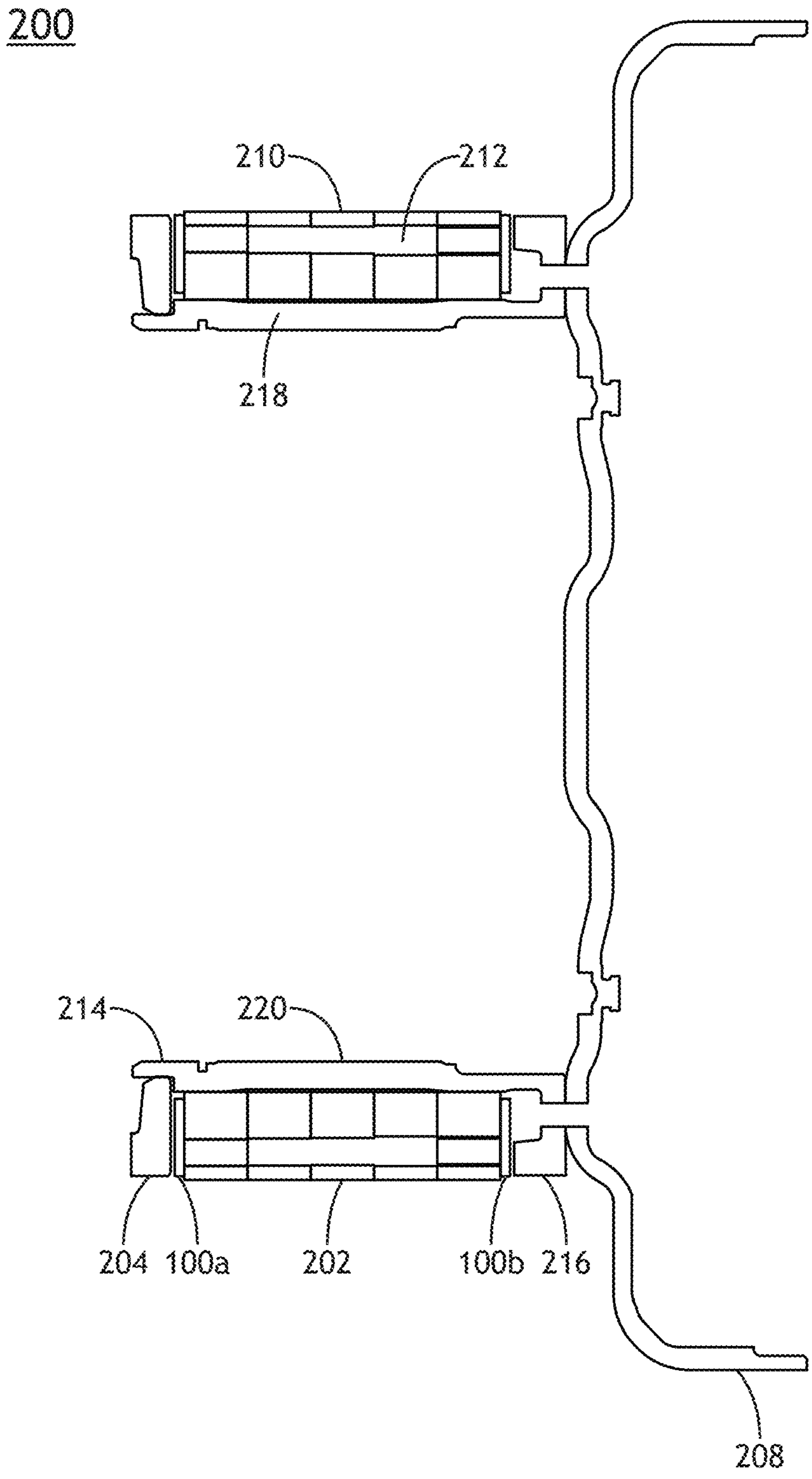
FIG. 2C depicts a section view of the rotor assembly, in accordance with one or more embodiments of the present disclosure.
Figure 2D:
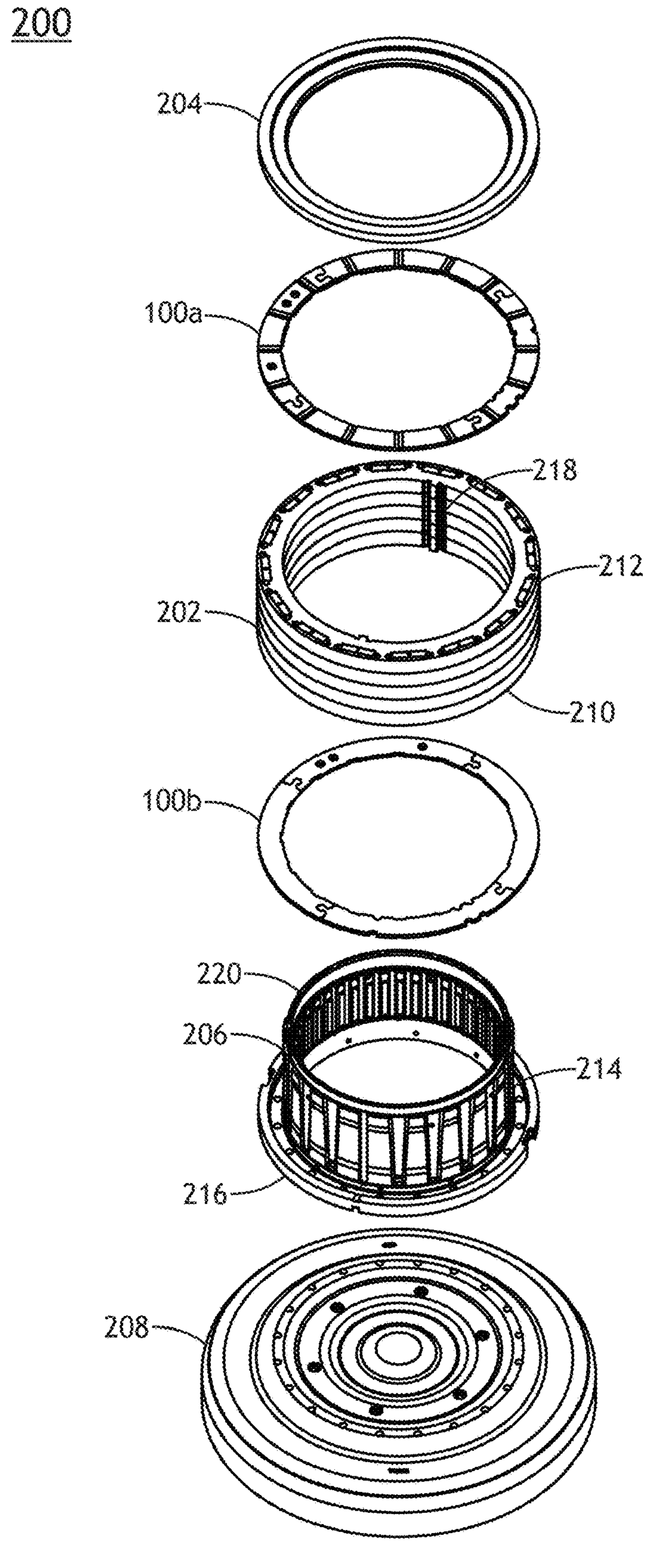
FIG. 2D depicts a front exploded view of the rotor assembly, in accordance with one or more embodiments of the present disclosure.
Figure 2E:
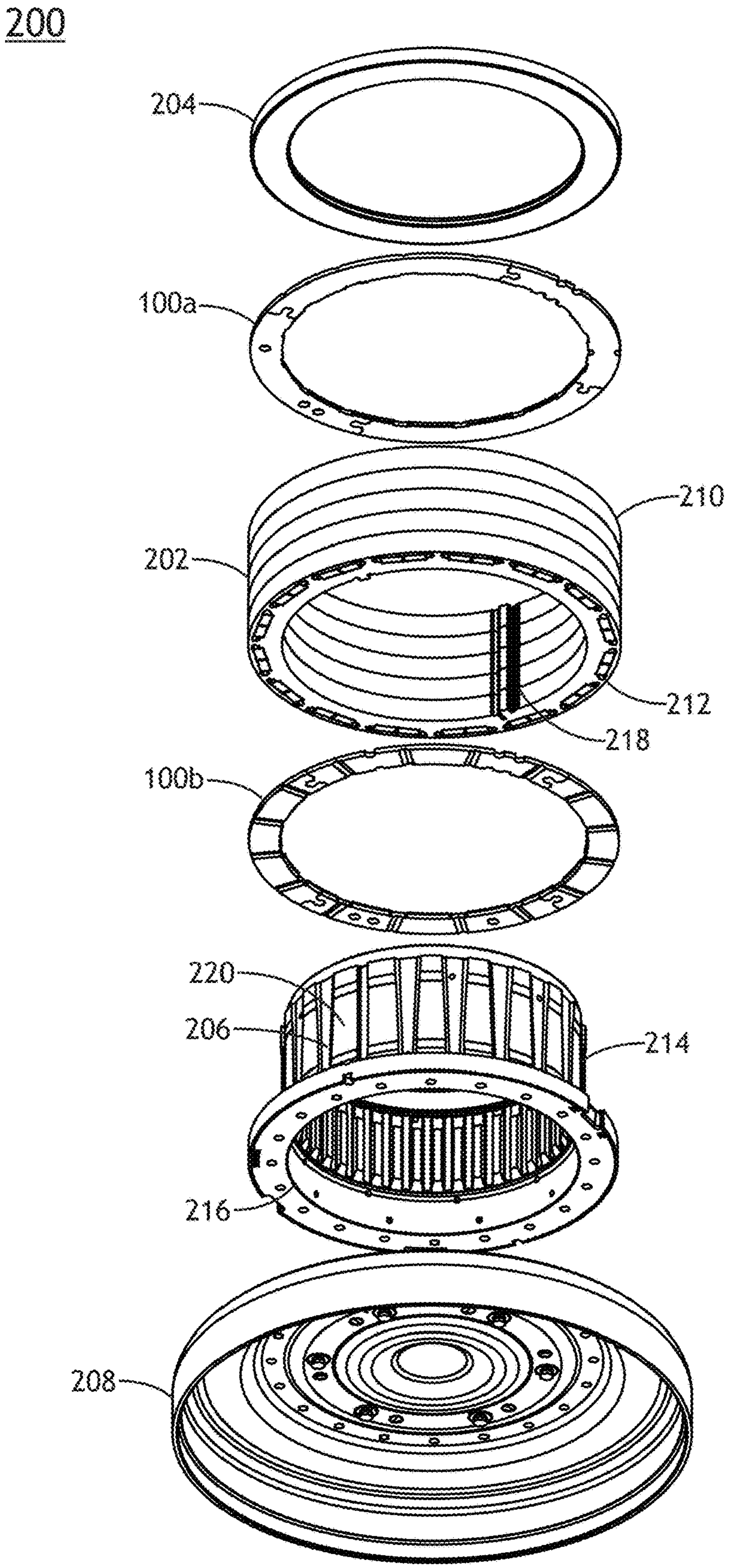
FIG. 2E depicts a rear exploded view of the rotor assembly, in accordance with one or more embodiments of the present disclosure.

FIGS. 1A-1C depict an end plate 100, in accordance with one or more embodiments of the present disclosure. The end plate 100 may be an annulus shape. The end plate 100 may include an inner diameter and an outer diameter which are both concentric to a center axis of the end plate 100. The inner diameter and the outer diameter may define the annulus shape.

The end plate 100 may include annular segments 102. The end plate 100 may be segmented into the annular segments 102. The annular segments 102 may be joined to form the end plate 100. The annular segments 102 may be segments of the annulus shape.

The annular segments 102 may include an inner diameter and an outer diameter which defines the inner diameter and the outer diameter, respectively, of the end plate 100. The inner diameter of each of the annular segments 102 may be the same to maintain the consistent inner diameter of the end plate 100. Similarly, the outer diameter of each of the annular segments 102 may be the same to maintain the consistent outer diameter of the end plate 100.

The annular segments 102 may include an outer arc length. The outer arc length may be length of the annular segments 102 along the outer diameter. The outer arc length of the annular segments 102 may define the outer circumference of the end plate 100. The outer arc length of the annular segments 102 may be the same or different for each of the annular segments 102 so long as the outer arc lengths sum to the outer circumference. As depicted, the outer arc length of the annular segments 102 is the same for each of the annular segments 102, although this is not intended to be limiting.

The end plate 100 may include any number of the annular segments 102. For example, the end plate 100 may include at least two of the annular segments 102. As depicted, the end plate 100 includes four of the annular segments 102, although this is not intended to be limiting. It is further contemplated that the end plate 100 may include more than four of the annular segments 102.

The annular segments 102 may include interlocking joints 104.

The interlocking joints 104 may radially interlock the annular segments 102. The annular segments 102 may be radially interlocked to adjacent of the annular segments 102 via the interlocking joints 104. The annular segments 102 may be prevented from moving radially (e.g., towards or away from the center axis) relative to adjacent of the annular segments 102 via the interlocking joints 104.

The interlocking joints 104 may include any type of interlocking joint. For example, the interlocking joints 104 may be jigsaw joints, dovetail joints, T-joints, or the like. The jigsaw joints, dovetail joints, and the T-joints may be rounded, trapezoidal, or T-shaped, respectively. As depicted, the interlocking joints 104 are jigsaw joints.

The interlocking joints 104 may include male joints 104*a* and female joints 104*b*. The male joints 104*a* may also be referred to as tabs, projections, or the like. The female joints 104*b* may also be referred to as sockets, blanks, or the like. The male joints 104*a* may be received within respective of the female joints 104*b*. Each of the jigsaw joints, dovetail joints, T-joints may include the male joints 104*a* and the female joints 104*b* where the shape of the male joints 104*a* and the female joints 104*b* determined the type of the joint.

Each of the annular segments 102 may include two of the interlocking joints 104. The two of the interlocking joints

104 may be disposed at opposing circumferential ends of the annular segments 102. The location of the interlocking joints 104 at the opposing circumferential ends may enable joining the annular segments 102 to adjacent of the annular segments 102 in the end plate 100.

The end plate 100 may include a matching number of the male joints 104*a* and the female joints 104*b*. The annular segments 102 may include two of the male joints 104*a*, one of the male joints 104*a* and one of the female joints 104*b*, or two of the female joints 104*b*, so long as the end plate 100 includes the matching number of the male joints 104*a* and the female joints 104*b*. As depicted, each of the annular segments 102 includes one of the male joints 104*a* and one of the female joints 104*b* disposed at opposing circumferential ends of the annular segments 102, although this is not intended to be limiting.

Although the interlocking joints 104 are described as including the male joints 104*a* and female joints 104*b*, this is not intended as a limitation of the present disclosure. It is further contemplated that the interlocking joints 104 may be a genderless joint. The genderless joint may include both a tab and a socket for mating. It is further contemplated that the interlocking joints 104 may both be female joints 104*b* and the end plate 100 may further include an additional male joint to be inserted into the female joints 104*b*. For example, such a configuration of the interlocking joints 104 may be a butterfly joint or the like.

The interlocking joints 104 may or may not axially interlock the annular segments 102.

The annular segments 102 may translate relative to adjacent of the annular segments 102 when the interlocking joints 104 do not axially interlock the annular segments 102. For example, the interlocking joints 104 may not axially interlock the annular segments 102 when the interlocking joints 104 are joined by a clearance fit.

The annular segments 102 may not translate relative to adjacent of the annular segments 102 when the interlocking joints 104 axially interlock the annular segments 102. For example, the interlocking joints 104 may axially interlock the annular segments 102 via an interference fit, by staking the interlocking joints 104 together, compressing the male joints 104*a* radially outwards and radially inwards into the female joints 104*b*, welding the interlocking joints 104, or the like. Staking may refer to deforming respective portions with one or more punches.

The annular segments 102 may be a non-ferromagnetic metal. The non-ferromagnetic metal may be any of paramagnetic, diamagnetic, or antiferromagnetic. The non-ferromagnetic magnetic metal may be a metal or metal alloy thereof. The non-ferromagnetic metal may be ferrous or non-ferrous. For example, the non-ferromagnetic metal may include, but is not limited to, aluminum, non-ferromagnetic stainless steel, copper, brass, or an alloy thereof.

The annular segments 102 may define radial grooves 106. The radial grooves 106 may be defined from the inner radius to the outer radius of the radial grooves 106. The radial grooves 106 may extend radially through the annular segments 102 along a line segment which points to the center axis of the end plate 100. The radial grooves 106 may be formed in the annular segments 102 via stamping. The radial grooves 106 may be a V-channel, a U-channel, or a rectangular-channel along the length of the line segment. The rectangular-channel may be an open-topped rectangular-channel. As depicted, the radial grooves 106 are a V-channel along the length of the line segment, although this is not intended to be limiting.

The annular segments 102 may define any number of the radial grooves 106. Each of the annular segments 102 may define at least one of the radial grooves 106. As depicted, each of the annular segments 102 include four of the radial grooves 106, although this is not intended to be limiting. It is further contemplated that the annular segments 102 may include more than four of the radial grooves 106. The number of the radial grooves 106 defined for each of the annular segments 102 may depend on the arc length of the annular segments 102. For example, annular segments 102 with shorter arc lengths may include fewer of the radial grooves 106 than annular segments 102 with longer arc lengths.

The radial grooves 106 may or may not be arranged in a polar array around the center axis of the end plate 100. The radial grooves 106 may be separated from adjacent of the radial grooves 106 by a same distance where the radial grooves 106 are arranged in the polar array. As depicted, the radial grooves 106 are arranged in the polar array, although this is not intended as a limitation of the present disclosure.

The annular segments 102 may include projecting lips 108. The projecting lips 108 may radially project inwards from the inner diameter of the annular segments 102. The projecting lips 108 may be separated from adjacent of the projecting lips 108 by the radial grooves 106.

The annular segments 102 may be fabricated from a sheet metal blank via a stamping process. For example, the annular segments 102 may be stamped in a linear array from the sheet metal blank. The linear array may include the outer diameter of the annular segments 102 disposed adjacent to the inner diameter of the adjacent annular segments.

Fabricating the end plate 100 from the annular segments 102, as opposed to a non-segmented annulus may reduce unused material of the sheet metal blank. The inner diameter of the non-segmented annulus may be scrap material. It is contemplated that the configuration of the annular segments 102 depicted may achieve approximately a 34-percent reduction in area of the sheet metal blank needed to make end plate 100 as compared to a non-segmented annulus. It is further contemplated that additional material saving may be provided by decreasing the spacing between adjacent of the annular segments 102 during stamping. The spacing between adjacent of the annular segments 102 during stamping may be decreased by decreasing the arc length (e.g., increasing the number of the annular segments 102 for each end plate 100).

FIGS. 2A-2E depict a rotor assembly 200, in accordance with one or more embodiments of the present disclosure. The rotor assembly 200 may include the end plate 100 (e.g., first end plate 100*a*, second end plate 100*b*), a rotor 202, a clamp ring 204, a rotor carrier hub 206, and/or a torque converter cover 208.

The rotor 202 may include rotor segments 210 and/or permanent magnets 212.

The rotor segments 210 may each include an annulus shape defining the inner diameter and the outer diameter of the rotor 202. The rotor segments 210 may be axially stacked together to define the rotor 202. The rotor 202 may include any number of the rotor segments 210. For example, the rotor 202 may include only one of the rotor segments 210. As depicted, the rotor 202 includes five of the rotor segments 210, although this is not intended as a limitation of the present disclosure. It is further contemplated that the rotor 202 may include more than five of the rotor segments 210.

The permanent magnets 212 may be disposed within the rotor segments 210. The permanent magnets 212 may be disposed within the rotor segments 210 in a polar array. Each of the rotor segments 210 may house any number of the permanent magnets 212. The number of the permanent magnets 212 may define the number of poles of the rotor 202. As depicted, the rotor 202 includes twelve of the permanent magnets 212 for each of the rotor segments 210, although this is not intended to be limiting.

The position of the permanent magnets 212 around the circumference of the rotor segments 210 may vary depending on the axial position of the rotor segments 210 within the rotor 202. Varying the position around the circumference may also vary the position of the poles. Thus, the circumferential position of the poles of the rotor 202 may vary depending upon the axial position of the rotor segments 210.

The rotor 202 may be axially disposed between and radially aligned with the first end plate 100*a* and the second end plate 100*b*. The first end plate 100*a* and the second end plate 100*b* may abut opposing ends of the rotor 202. The abutment of the first end plate 100*a* and the second end plate 100*b* with the rotor 202 may axially affix together the rotor segments 210.

The rotor carrier hub 206 may include body section 214 and a flange section 216. The flange section 216 may axially and radially extend from the body section 214.

The first end plate 100*a*, rotor 202, and/or the second end plate 100*b* may be disposed radially outwards of and axially aligned with the body section 214 of the rotor carrier hub 206. An inner diameter of the first end plate 100*a*, rotor 202, and/or the second end plate 100*b* may include a clearance fit about an outer diameter of the body section 214. For example, an inner diameter of the rotor segments 210 may include the clearance fit about an outer diameter of the body section 214.

The rotor 202 and the body section 214 of the rotor carrier hub 206 may be radially connected. The rotor 202 and the body section 214 of the rotor carrier hub 206 may include a spline 218. The rotor 202 and the body section 214 of the rotor carrier hub 206 may be radially connected via the spline 218. The spline 218 may be on an inner diameter of the rotor 202 and the outer diameter of the rotor carrier hub 206. The rotor 202 may be radially connected to the rotor carrier hub 206 via the spline 218. The radially connection via the spline 218 may enable transmitting torque from the rotor 202 to the rotor carrier hub 206. The spline 218 may or may not prevent the rotor 202 from axially translating relative to the body section 214.

The second end plate 100*b* may be axially disposed between the rotor 202 and the flange section 216 of the rotor carrier hub 206. The second end plate 100*b* may abut both the rotor 202 and the flange section 216. The flange section 216 may provide axial retention for the rotor 202 and the second end plate 100*b* in the direction of the flange section 216 via the abutment of the second end plate 100*b*.

The clamp ring 204 may be disposed radially outwards of and axially aligned with an end of the body section 214, where the end is opposed to the flange section 216. The first end plate 100*a* may be axially disposed between the clamp ring 204 and the rotor 202. The clamp ring 204 may be staked radially inward to the body section 214. Staking the clamp ring 204 to the body section 214 of the rotor carrier hub 206 may axially clamp together the clamp ring 204, the first end plate 100*a*, the rotor 202, the second end plate 100*b*, and the flange section 216 of the rotor carrier hub 206. Clamping together the clamp ring 204, the first end plate 100*a*, the rotor 202, the second end plate 100*b*, and the flange section 216 may axially interlock the annular segments 102. The annular segments 102 may remain axially interlocked even when the interlocking joints 104 themselves do not axially interlock the annular segments 102.

The clamp ring 204 may be made of a select material. The material may include sufficient ductility to enable the staking and maintain the clamping after the staking. For example, the clamp ring 204 may be formed of a non-ferrous metal. The non-ferrous metal may be may be bronze, high strength low alloy (HSLA) steel, or the like.

The interlocking joints 104 may radially affix the annular segments 102 and prevent the annular segments 102 from radially translating outwards in the event the rotational loads on the rotor assembly 200 exceed the frictional force due to clamping, where the frictional force is orthogonal to the clamping force and is based on both the coefficient of friction and the magnitude of the clamping force.

The first end plate 100*a* and the second end plate 100*b* may magnetically isolate the permanent magnets 212 from the clamp ring 204 and the flange section 216, respectively. Thus, the first end plate 100*a* and the second end plate 100*b* may provide a non-ferromagnetic material through which to clamp together the clamp ring 204, the first end plate 100*a*, the rotor 202, the second end plate 100*b*, and the flange section 216 of the rotor carrier hub 206. It is undesirable to have a ferromagnetic material touching the permanent magnets 212 because the ferromagnetic material may reduce the efficiency of the rotor assembly 200 by shorting out the poles of the permanent magnets 212. For example, the first end plate 100*a* and the second end plate 100*b* may block eddy currents, which are short circuits of the magnetic flux field and lead to low efficiency.

The rotor carrier hub 206 may be made of a select material. For example, the rotor carrier hub 206 may be made of aluminum, which may reduce the weight and rotational inertia of the rotor carrier hub 206 as compared to steel.

The rotor carrier hub 206 and the torque converter cover 208 may be affixed. For example, the rotor carrier hub 206 and the torque converter cover 208 may be affixed by one or more rivets.

The torque converter cover 208 may be made of a select material. For example, the torque converter cover 208 may be made of steel, reducing the cost of manufacturing the torque converter cover 208 and increasing the durability of the torque converter cover 208, as compared to aluminum.

The rotor carrier hub 206 may include internal spline 220. The internal spline 220 may axially extend along the body section 214.

Torque may be generated by the rotor 202 in response to an external magnetic field. The rotor 202 may transmit the torque to the rotor carrier hub 206 (e.g., via the spline 218). The rotor carrier hub 206 may then transmit the torque from the rotor 202 to the torque converter cover 208 and/or to the internal spline 220.

The rotor carrier hub 206 may also receive torque from the internal spline 220 and transmit the torque to the torque converter cover 208.

Figure 3:
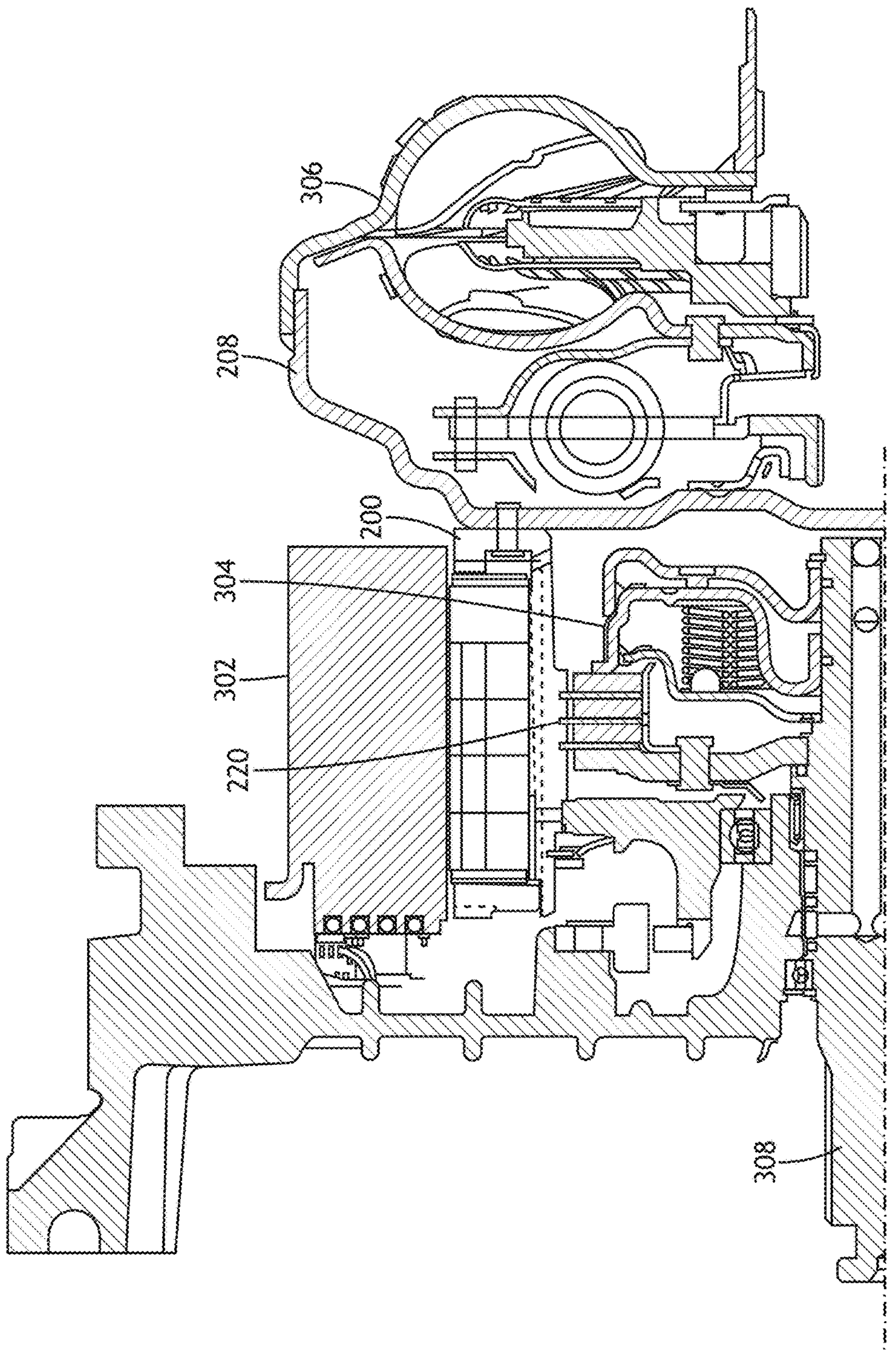
FIG. 3 depicts a partial section view of an electric motor with the stator, in accordance with one or more embodiments of the present disclosure.

FIG. 3 depicts an electric motor 300, in accordance with one or more embodiments of the present disclosure. The electric motor 300 may be a modular hybrid transmission (MHT), a hybrid module, an electric axle, or the like. The electric motor 300 may include the rotor assembly 200, a stator 302, a clutch 304, and/or a torque converter 306.

The rotor 202 may be disposed radially inwards of and axially aligned with the stator 302. The stator 302 may be configured to generate the magnetic field causing the rotor 202 to generate the torque.

The clutch 304 may include a shaft 308. The shaft 308 may be arranged to receive torque from and transmit torque to an internal combustion engine (not depicted). The clutch 304 may be configured to engage and disengage with the internal spline 220 for transmitting torque between the shaft 308 and the rotor carrier hub 206. When the clutch 304 is engaged, the torque generated by the rotor 202 may be transmitted through the rotor carrier hub 206 and the clutch 304 to the shaft 308 for starting the internal combustion engine. When the clutch 304 is engaged, the torque generated by the internal combustion engine may be transmitted through the clutch 304 and the rotor carrier hub 206 to the torque converter cover 208.

The torque converter 306 may be affixed to the torque converter cover 208. Torque may be transmitted through the rotor assembly 200 to the torque converter 306 via the torque converter cover 208. The torque (e.g., from the rotor 202 and/or the shaft 308) may be transmitted through the rotor carrier hub 206 and the torque converter cover 208 to the torque converter 306. The torque converter 306 may configured for attachment to a transmission (not depicted).

The electric motor 300 can function in at least three modes. For a first mode, the clutch 304 is disengaged and the stator 302 is driving the rotor 202 such that the rotor 202 is the only source of torque for the torque converter 306. For a second mode, the clutch 304 is engaged and the stator 302 is not driving the rotor 202 such that the shaft 308 is the only source of torque for the torque converter 306. For a third mode, the clutch 304 is engaged and the stator 302 is driving the rotor 202 such that the rotor assembly 200 is a source of torque for the shaft 308.

Fluid may be provided to cool the electric motor 300 and wet the clutch 304. The fluid may flow past the rotor assembly 200 after leaving the clutch 304 and be sprayed outward on the stator 302. The oil may pass radially outwards through the rotor assembly 200 via the radial grooves 106. In this regard, the radial grooves 106 may also be referred to as fluid grooves or fluid channels. The fluid may cool the rotor 202 as the fluid travels radially outwards through the radial grooves 106.

The term "axial" and derivatives thereof, such as "axially," shall be understood to refer to a direction along the axis of rotation. Further, the term "radial" and derivatives thereof, such as "radially," shall be understood in relation to the axis. For example, "radially outwards" refers to further away from the axis, while "radially inwards" refers to nearer to the axis. The term "circumferential" and derivatives thereof, such as "circumferentially," shall be understood in a circumference at a fixed radius in relation to the axis.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 end plate
100*a* first end plate
100*b* second end plate
102 annular segments
104 interlocking joints
104*a* male joints
104*b* female joints
106 radial grooves
108 projecting lips
200 rotor assembly
202 rotor
204 clamp ring
206 rotor carrier hub
208 torque converter cover
210 rotor segments
212 permanent magnets
214 body section
216 flange section
218 spline
220 internal spline
300 electric motor
302 stator
304 clutch
306 torque converter
308 shaft

What is claimed:

1. An end plate for a rotor assembly comprising:
- a plurality of annular segments defining an annulus shape, the plurality of annular segments are a non-ferromagnetic metal, the plurality of annular segments comprise:
  - a plurality of interlocking joints radially interlocking the plurality of annular segments; and
  - a plurality of radial grooves defined radially from an inner radius to an outer radius of the plurality of annular segments, the plurality of radial grooves are defined partially through a thickness of the plurality of annular segments, the plurality of radial grooves are circumferentially offset from the plurality of interlocking joints.

2. The end plate of claim 1, wherein the plurality of radial grooves extend radially through the plurality of annular segments along a line segment that points to a center axis of the end plate.

3. The end plate of claim 1, wherein the plurality of annular segments comprise an outer arc length, wherein the outer arc length is a same length for each of the plurality of annular segments.

4. The end plate of claim 1, wherein the plurality of interlocking joints are one of jigsaw joints, dovetail joints, or T-joints.

5. The end plate of claim 1, wherein each of the plurality of annular segments comprises two of the plurality of interlocking joints disposed at opposing circumferential ends of the plurality of annular segments.

6. The end plate of claim 5, wherein the plurality of interlocking joints comprise a plurality of male joints and a plurality of female joints, wherein the plurality of male joints are received within the plurality of female joints, wherein the end plate comprises a matching number of the plurality of male joints and the plurality of female joints.

7. The end plate of claim 6, wherein each of the plurality of annular segments comprises one of the plurality of male joints and one of the plurality of female joints.

8. The end plate of claim 1, wherein the plurality of interlocking joints do not axially interlock the plurality of annular segments, wherein the plurality of interlocking joints comprise a clearance fit.

9. The end plate of claim 1, wherein the plurality of interlocking joints axially interlock the plurality of annular segments.

10. The end plate of claim 1, wherein the non-ferromagnetic metal comprises at least one of aluminum, non-ferromagnetic stainless steel, copper, brass, or an alloy thereof.

11. The end plate of claim 1, wherein the plurality of radial grooves are one of a V-channel, a U-channel, or a rectangular-channel.

12. The end plate of claim 1, wherein each of the plurality of annular segments comprises at least one of the plurality of radial grooves.

13. The end plate of claim 1, wherein the plurality of radial grooves are arranged in a polar array.

14. The end plate of claim 1, wherein the plurality of annular segments are fabricated from a sheet metal blank via a stamping process.

15. A rotor assembly comprising:

a first end plate and a second end plate comprising:

a plurality of annular segments defining an annulus shape, the plurality of annular segments are a non-ferromagnetic metal, the plurality of annular segments comprise:

a plurality of interlocking joints radially interlocking the plurality of annular segments; and a plurality of radial grooves defined radially from an inner radius to an outer radius of the plurality of annular segments, the plurality of radial grooves are defined partially through a thickness of the plurality of annular segments, the plurality of radial grooves are circumferentially offset from the plurality of interlocking joints;

a rotor comprising one or more rotor segments and a plurality of permanent magnets, the plurality of permanent magnets are disposed within the one or more rotor segments, the rotor is axially disposed between and radially aligned with the first end plate and the second end plate;

a rotor carrier hub comprising a body section and a flange section, the flange section axially and radially extends from the body section; and a clamp ring, the first end plate, the rotor, the second end plate, and the clamp ring are disposed radially outwards of and axially aligned with the body section, the second end plate is axially disposed between the rotor and the flange section, the first end plate is axially disposed between the clamp ring and the rotor, the clamp ring axially clamps together the clamp ring, the first end plate, the rotor, the second end plate, and the flange section.

16. The rotor assembly of claim 15, wherein clamping together the clamp ring, the first end plate, the rotor, the second end plate, and the flange section axially interlocks the plurality of annular segments.

17. The rotor assembly of claim 15, wherein an inner diameter of the one or more rotor segments includes a clearance fit about an outer diameter of the body section.

18. The rotor assembly of claim 17, the rotor and the body section are radially connected via a spline.

19. The rotor assembly of claim 15, the first end plate magnetically isolates the plurality of permanent magnets from the clamp ring, the second end plate magnetically isolates the plurality of permanent magnets from the flange section.

20. An electric motor comprising:

a rotor assembly comprising:

a first end plate and a second end plate comprising:

a plurality of annular segments defining an annulus shape, the plurality of annular segments are a non-ferromagnetic metal, the plurality of annular segments comprise:

a plurality of interlocking joints radially interlocking the plurality of annular segments; and a plurality of radial grooves defined radially from an inner radius to an outer radius of the plurality of annular segments, the plurality of radial grooves are defined partially through a thickness of the plurality of annular segments, the plurality of radial grooves are circumferentially offset from the plurality of interlocking joints;

a rotor comprising one or more rotor segments and a plurality of permanent magnets, the plurality of permanent magnets are disposed within the one or more rotor segments, the rotor is axially disposed between and radially aligned with the first end plate and the second end plate;

a rotor carrier hub comprising a body section and a flange section, the flange section axially and radially extends from the body section; and a clamp ring; the first end plate, the rotor, the second end plate, and the clamp ring are disposed radially outwards of and axially aligned with the body section, the second end plate is axially disposed between the rotor and the flange section, the first end plate is axially disposed between the clamp ring and the rotor, the clamp ring axially clamps together the clamp ring, the first end plate, the rotor, the second end plate, and the flange section; and a stator, the rotor is disposed radially inwards of and axially aligned with the stator, the stator is configured to generate a magnetic field causing the rotor to generate torque.

* * * * *